United States Patent
Höbel et al.

(10) Patent No.: US 10,768,086 B2
(45) Date of Patent: Sep. 8, 2020

(54) METHOD FOR DETERMINING THE AVERAGE PARTICLE SIZE OF PARTICLES WHICH ARE SUSPENDED IN A LIQUID AND FLOWING MEDIUM, BY MEANS OF DYNAMIC LIGHT SCATTERING, AND A DEVICE THEREFORE

(71) Applicant: FRAUNHOFER-GESELLSCHAFT ZUR FÖRDERUNG DER ANGEWANDTEN FORSCHUNG E.V., Munich (DE)

(72) Inventors: Peter Höbel, Mainz (DE); Michael Maskos, Bodenheim (DE)

(73) Assignee: Fraunhofer-Gesellschaft zur Förderung der angewandten Forschung e.V., Munich (DE)

(\*) Notice: Subject to any disclaimer, the term of this patent is extended or adjusted under 35 U.S.C. 154(b) by 86 days.

(21) Appl. No.: 16/315,127

(22) PCT Filed: Jul. 3, 2017

(86) PCT No.: PCT/EP2017/066516
§ 371 (c)(1),
(2) Date: Jan. 3, 2019

(87) PCT Pub. No.: WO2018/007328
PCT Pub. Date: Jan. 11, 2018

(65) Prior Publication Data
US 2019/0323937 A1   Oct. 24, 2019

(30) Foreign Application Priority Data
Jul. 4, 2016 (DE) .......... 10 2016 212 164

(51) Int. Cl.
*G01N 15/02* (2006.01)
*G06T 7/10* (2017.01)
*G06T 7/521* (2017.01)

(52) U.S. Cl.
CPC ..... *G01N 15/0211* (2013.01); *G01N 15/0227* (2013.01); *G06T 7/10* (2017.01);
(Continued)

(58) Field of Classification Search
CPC ........... G01N 15/1459; G01N 15/0205; G01N 2015/1497; G01N 2015/1493;
(Continued)

(56) References Cited

U.S. PATENT DOCUMENTS 5,366,858 A * 11/1994 Koizumi .......... G01N 33/56911
435/5
6,473,698 B1   10/2002 Albert et al.
(Continued)

FOREIGN PATENT DOCUMENTS

KR   2015-0119765 A   10/2015
WO   2015/136038 A2   9/2015

OTHER PUBLICATIONS

Alfred B. Leung et al.; "Particle-size and Velocity Measurements in Flowing Conditions Using Dynamic Light Scattering"; Applied Optics; Apr. 1, 2006; pp. 2186-2190; vol. 45, No. 10.
(Continued)

*Primary Examiner* — Quan M Hua
(74) *Attorney, Agent, or Firm* — Studebaker & Brackett PC

(57) ABSTRACT

In determining the size of particles in a flowing sample, initially scattered light is detected on a detector, in the form of images, standardization of the measured images takes place and determination of an offset and of an angle of rotation at least of a partial region of two temporally
(Continued)

Figure 1:
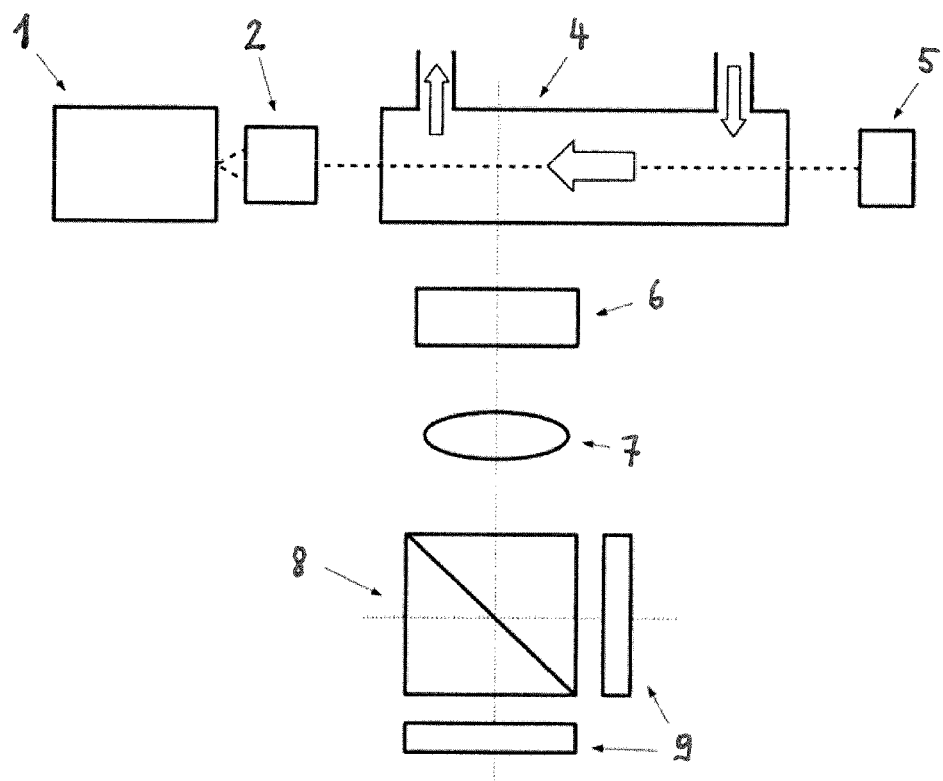

successive images relative to each other is effected. Two images congruent are subdivided into many partial areas with respectively a specific number of pixels and averaging of the brightness values of each individual partial area is implemented. Subsequently, the average brightness value of a partial area of the first image is correlated with the average brightness value of the partial area made congruent with this partial area in the second image (cross-correlation between the images). For each pair of congruent partial areas of the images, a correlation value is thereby produced.

18 Claims, 3 Drawing Sheets

(52) U.S. Cl.
CPC ...... *G06T 7/521* (2017.01); *G01N 2015/0222* (2013.01); *G06T 2207/10052* (2013.01)

(58) Field of Classification Search
CPC ....... G01N 2015/1486; G01N 15/0211; G01N 15/1463; G01N 21/0303; G01N 2015/025; G01N 2021/4707; G01N 21/53; G01N 2015/0038; G01N 2015/0222; G01N 2035/00188; G01N 2035/00217; G01N 21/25; G01N 21/85; G01N 2201/068; G01N 2015/0216; G01N 2015/1075

See application file for complete search history.

(56) References Cited

U.S. PATENT DOCUMENTS

| | | | |
|---|---|---|---|
| 2012/0268731 A1* | 10/2012 | Zhu | G01N 21/7746 356/73 |
| 2014/0132943 A1 | 5/2014 | Chou | |
| 2017/0003271 A1* | 1/2017 | Nadkarmi | G01N 21/21 |

OTHER PUBLICATIONS

Lili Liu et al.; "Particle-size Measurements in a Micro-channel with Image Dynamic Light Scattering Method"; Procedia Engineering; 2015; pp. 904-910; vol. 102.

Puthusserickal A. Hassan et al., "Making Sense of Brownian Motion: Colloid Characterization by Dynamic Light Scattering"; Langmuir; 2015; pp. 3-12; vol. 31.

International Search Report issued in PCT/EP2017/066516; dated Sep. 29, 2017.

* cited by examiner

METHOD FOR DETERMINING THE AVERAGE PARTICLE SIZE OF PARTICLES WHICH ARE SUSPENDED IN A LIQUID AND FLOWING MEDIUM, BY MEANS OF DYNAMIC LIGHT SCATTERING, AND A DEVICE THEREFORE

The invention relates to determining the size of particles in a flowing sample with the help of light scattering measurements. The invention is based on the fact that initially scattered light is detected on a detector in the form of images, standardisation of the measured images takes place and determination of an offset and an angle of rotation at least of a partial region of two temporally successive images relative to each other is effected, this information is used in order to make the two images congruent. The congruent images are subdivided into many partial areas with respectively a specific number of pixels and averaging of the brightness values of each individual partial area is implemented. Subsequently, the average brightness value of a partial area of the first image is correlated with the average brightness value of the partial area made congruent with this partial area in the second image (cross-correlation between the images). For each pair of congruent partial areas of the images, a correlation value is thereby produced. Thereafter averaging takes place over all the calculated correlation values. An average correlation value for each image pair results herefrom. Then the delay time of the detector is varied in order to determine an autocorrelation function of the scattered light signals and to calculate therefrom the average size of the particles.

Dynamic light scattering is above all suitable for determining particle sizes in the nanometre range, i.e. for sizes below the wavelength of visible light. However also larger particles can be measured. If small particles are irradiated with light, the wavelength of which is in the size range of the particles diameters, then Rayleigh scattering is produced.

If small particles are irradiated with laser light, then coherent scattered light is produced. The scattered light of many particles is superimposed and forms interference patterns. If the particles are in a suspension with e.g. water, then they carry out Brownian motion. Therefore dynamic interference patterns are produced during irradiation of a particle suspension. The temporal development of this pattern is measured with dynamic light scattering (DLS).

Just as the Brownian motion of the particles, the signal detected with the detector, in the case of a sufficiently large number of particles, is purely statistical. By multiplying two signal values with a temporal interval r and subsequent averaging over the products of many pairs of values, the correlation $(A)_\tau$ of the signal for the correlation time $\tau$ can be calculated via the correlation $(A)_\tau = (A1_\tau + A2_\tau + A3_\tau + \ldots An_\tau)/n$, with n=a whole number greater than 0. If the sample behaves ergodically, i.e. does not change its statistical properties during the entire measuring time (stable temperature, number of particles, etc.), then the averaging can take place in principle in two ways (ergodic hypothesis);
1. The signal of a detector is tracked over a long time period and averaging takes place over the products of many temporally successively measured pairs of values, i.e. the temporal average is calculated; or
2. The signals of a large number of detectors measuring simultaneously and under the same conditions are evaluated. Each detector hereby produces only one pair of values. With the condition that the ergodic hypothesis is valid for the experiment, averaging takes place over the products of the pairs of values of all detectors, i.e. the ensemble average is calculated.

By calculating the correlation values for many different correlation times, the autocorrelation function of the signal can be determined. For determining the autocorrelation function, the calculated correlation values are plotted against the corresponding correlation times. The autocorrelation function can fit, in the simplest case, with a monoexponential decline. This idealised case occurs if all the particles of the sample are spherical and have the same size. In this case, there applies:

$$\langle A(0)A(\tau)\rangle \approx y_0 + C \cdot e^{\left(-\frac{1}{\tau_D}\cdot\tau\right)}$$

The temporal constant is proportional to the reciprocal of the diffusion coefficient of the particles in the suspension $\tau_D \sim 1/D$. Therefore, D can be calculated from $\tau_D$ with the help of the known scattering angle, the laser wavelength and the refractive index of the solvent. Via the diffusion coefficient D, the temperature T and the viscosity $\eta$ of the solvent, the hydrodynamic radius $R_h$ of the particles is produced and hence then, the particle size from the Stokes-Einstein equation. If large particles, with slow Brownian motion, are measured, then the autocorrelation function decreases slowly. If however small particles are measured, the autocorrelation function decreases rapidly. Therefore, in the size determination of smaller particles, shorter correlation times must be measured than with larger particles in order to determine the autocorrelation function adequately.

In order to implement measurements on samples flowing through the scattering volume with uniform speed, a fit function, adapted for a flowing sample, is used for evaluating the autocorrelation function calculated from the measured values (for time-averaged measurements, see e.g. Kwang, I. et al., 2006, Applied Optics, vol. 45, p. 2186-2190). A great disadvantage for time-averaged measurements results however if larger particles or particles in samples with high viscosity are intended to be measured. Since in these cases the decline times of the autocorrelation function are relatively long, because of the slowed Brownian motion, the overall measuring time is also extended because longer correlation times require to be measured. This in turn places demands on the homogeneity of the sample which is intended to be used for determining the average particle size of particles in the measuring method or in the measuring device. If, during the measurement, the properties thereof change, this produces deviations in the measured results. A measuring method with ensemble averaging, in contrast to a method with temporal averaging, is better suited for measurements on flowing samples (for a measuring method with ensemble averaging, see e.g. Zhang et al., 2015, Procedia Engineering, vol. 102, p. 904-910).

In a measuring method with ensemble averaging, a high-speed camera is used for data recording. The calculated correlation values here are likewise evaluated with the fit function adapted for flow measurements. The advantage of this method resides in the short measuring time. Instantaneous recordings of a flowing sample are possible. The disadvantage resides in the lower limit, caused by the image rate of the high-speed camera, for the temporal interval of two measurements, and hence of the correlation times. Small particles and high flow speeds, which would cause autocorrelation functions with very short decline times, cannot therefore be measured.

Furthermore, for the measurement on a flowing sample, in the state of the art, a fit function adapted for flow measurements is used for evaluating the autocorrelation function calculated from the measured values. As a result, several disadvantages result:

the subsequent data evaluation becomes more difficult. It would be essentially easier if, during a flow measurement, the same data processing as during a measurement without flow could be used. For measurements without flow, there are already several established methods for analysing the calculated correlation values, even for very "difficult" samples with particle size distributions and non-spherical particles (see e.g. Puthusserickal S. R. et al., 2015, Langmuir, vol. 31, p. 3-12);

during the measurement, the flow speed must remain constant since this has an effect on the form of the autocorrelation function; and the maximum flow speed, at which measurements can still be implemented, is dependent upon the smallest measurable correlation time.

If two pixel sensors, coupled by a beam splitter, are used, then these must be adjusted relative to each with micrometric precision. Only in this way is it ensured that the corresponding pixels of both detectors measure precisely the same angle range of the scattered light, and the signals thereof are able to be correlated. This makes production of a measuring device based on this measuring method time- and cost-intensive and the construction susceptible to vibration.

Starting herefrom, it was the object of the present invention to provide a method and a device with which the size of particles in liquid and flowing samples can be determined within a short time frame with high precision.

The object is achieved by the method according to claim 1 and the device according to claim 11. The dependent claims reveal advantageous developments.

According to the invention, a method for determining the average particle size of particles, which are suspended in a liquid and flowing medium, via dynamic light scattering, is provided, comprising the steps a) conducting a liquid medium with specific viscosity and specific refractive index, which comprises particles in suspended form, in a laminar flow through a throughflow cuvette along a flow direction;

b) radiation of laser light with a specific wavelength in a radiation direction onto the liquid medium via a laser, a collimator being disposed between the laser and the throughflow cuvette;

c) measuring the temperature of the liquid medium;

d) measuring the intensity of scattered laser light via a detector in the form of images, the detector being disposed perpendicular to the flow direction and at a specific angle of 10° to <180° relative to the radiation direction, and the detector i) comprising a beam splitter which deflects the scattered laser light onto a first and a second light-sensitive sensor, the two sensors being suitable for detecting images with respectively a specific number of pixels, and the two sensors being configured such that they alternately detect scattered laser light with a specific delay time as image; or ii) comprising a camera which has a light-sensitive sensor surface and which is suitable for detecting images with respectively a specific number of pixels, the sensor surface being configured such that it detects scattered laser light with a specific delay time between two successive images as image; and e) transmitting the images measured at the detector to a data processing device, the data processing device implementing the following steps:

1) standardising the measured images so that the measured intensity of the laser light (i.e. the exposure values of the pixels) obtains the same average and the same standard deviation in the case of all images;

2) determining an offset and an angle of rotation of a pattern on at least a partial region of a first image relative to a pattern on at least a partial region of a second image following temporally thereafter and use of this information in order to make the patterns of the two images congruent;

3) subdividing the congruent images respectively into many individual partial areas with respectively a specific number of pixels and averaging the brightness values of the pixels of the many individual partial areas; and 4) correlating the averaged brightness values of the pixels of the many individual partial areas of the first image with the averaged brightness values of the pixels of the many individual congruent partial areas of the second image (cross-correlation between the individual images), a correlation value being produced for each pair of congruent partial areas of the two images;

5) averaging over all obtained correlation values to form an average correlation value for the two images.

The method is characterised in that steps c) to d) are implemented with at least a first and a second, different from the first, delay time, an autocorrelation function is indicated from the hereby respectively obtained, averaged correlation values, and the average particle size is determined by means of the autocorrelation function, the measured temperature of the liquid medium, the viscosity and the refractive index of the liquid medium, the wavelength of the laser light, the angle of the detector.

The pattern during determination of an offset and of an angle of rotation can concern an interference pattern.

There is understood by the term "specific", with respect to the viscosity of the liquid medium, the refractive index of the liquid medium, the wavelength of the laser light and the angle of the detector, a concrete and known value for the viscosity of the liquid medium, the refractive index of the liquid medium, the wavelength of the laser light and the angle of the detector.

The delay time between two temporally successive images is the correlation time, against which the correlation value, calculated subsequently in the method, of the two images (in the autocorrelation function) is plotted. After the exposures, the dead time of the sensors must elapse. Thereafter, the sensors are again ready for use and the next images can be recorded.

One advantage of the method according to the invention is that, by determining an offset and an angle of rotation at least of a partial region of two temporally successive images relative to each other, compensation for the flow movement takes place. As a result, methods for measured data processing, which are less suitable for flowing samples, can be used. Also samples with high flow speeds are consequently measurable. Furthermore, the flow speed during the measurement need not hereby be constant but rather can vary since the variation is compensated for. The method can be implemented economically since the parts for sensors and lasers, used in the method, are found in economical consumer products, such as digital cameras or video projectors.

The variant of the method according to the invention, in which two sensors are used alternately via a beam splitter, has the additional advantage that the temporal delay between the images at the first sensor and at the second sensor is independent of the maximum image rates of the sensors or the dead time thereof. After the first pixel detector has measured and it is necessary now to wait until the dead time has elapsed, the second measurement is implemented by the second pixel detector. Therefore the measurements can be implemented in a substantially shorter time interval than with a high-speed camera and shorter correlation times are possible.

Determination of an offset and of an angle of rotation at least of one partial region of two temporally successive images relative to each other can take place in the following way: a small image section from a first image is compared, at various positions and with different angles of rotation, with an equally sized part of the temporally successive second image. This takes place, for example, by calculating at the various positions and with various angles of rotation, the standard deviation or a correlation value between the section from the first image with the respective position in the second image. The greater the correlation value or respectively the smaller the standard deviation, the more the section from the first image matches the respective position in the second image. By means of many tests, the position at which the section from the first image optimally matches the second image is thus found. The displacement and the rotation between the images is calculated therefrom. In order to make congruent the images which are temporally successive and displaced mutually because of the flow, a configuration of laser, throughflow cuvette and detector is required, as is described in the method according to the invention. In fact, only with the described configuration of laser, throughflow cuvette and detector, images result which are mutually displaced by the flow of liquid medium with the particles suspended therein. If the configuration was different, then two temporally successive images (i.e. the second image relative to the first image) would not be displaced. Two temporally successive images would simply deviate from each other all the more the faster the liquid medium with the suspended particles (i.e. the sample) flows through the throughflow cuvette. In contrast to the state of the art, it is not necessary according to the invention to compensate for this deviation with an evaluation of the autocorrelation function adapted for the flow. Consequently it is possible with the method according to the invention to implement a particle size determination in a far larger flow speed- and particle size range.

The subdivision of the congruent images into many partial areas with respectively a specific number of pixels, averaging of the brightness values of the pixels of the many individual partial areas and the cross-correlation between the individual images, can take place in the following way: the two congruent images are subdivided into smaller areas (virtual detectors). Thereafter, averaging takes place over the brightness values of the pixels within respectively one virtual detector. For each virtual detector in the first image, there is a corresponding virtual detector in the temporally successive second image. The brightness averages of the two virtual detectors are multiplied. Thereafter, averaging takes place over the products of all virtual pairs of detectors of the images or of a partial region thereof. This average value is the correlation value which is plotted in the autocorrelation function against the temporal offset between the two sensor recordings, the correlation time.

The method according to the invention can be characterised in that a liquid medium which is transparent for the wavelength of the laser light is used.

The particles can have an average size in the nanometre range to micrometre range, preferably an average size of 1 nm to 1,000 µm, measured with dynamic light scattering.

The throughflow cuvette can have a diameter perpendicular to the flow direction which is greater than the diameter of the radiated laser light. By means of these measures, as small a section as possible of the parabolic flow profile in the throughflow cuvette is illuminated and the particles in the laser beam have as uniform as possible a motion speed.

The laser can radiate the laser light parallel to the flow direction or at an angle of $>0°$ to $<180°$ (e.g. 90°) relative to the flow direction. Radiation at an angle $>0°$ to $<180°$ relative to the flow direction has the advantage that the connections for the sample inflow and sample outflow need not be disposed perpendicular to the radiation direction at the throughflow cuvette (i.e. on the long side thereof), but rather can also be disposed parallel to the radiation direction at the throughflow cuvette (i.e. at its transverse side). As a result, turbulence of the liquid medium can be avoided and a laminar flow can be ensured even at high flow rates. Furthermore, the laser light in this variant passes through a smaller sample volume and is hence less strongly attenuated in the case of concentrated samples, which enables measurement also of highly concentrated samples.

In a preferred embodiment, the light-sensitive sensors and/or the light-sensitive sensor surface comprise a sensor which is selected from the group consisting of CCD sensors, CMOS-APS sensors, photodiode arrays, avalanche photodiode arrays and combinations hereof, or consists thereof. An avalanche photodiode array has the advantage that it has high detection sensitivity.

In the data processing device, determination of an offset and of an angle of rotation of the signals measured at the two detectors can be effected via a digital image processing method, preferably the "template matching" method.

The measured images are subdividable into more than 100, preferably more than 1,000, particularly preferably more than 10,000, in particular more than 90,000, partial areas (virtual detectors). Preferably, ≤4 pixels are combined to form a partial area (i.e. to form a virtual detector).

The delay time between the first and second detector can be less than 10 sec., preferably less than 1 sec., particularly preferably less than 10 msec., in particular less than 0.1 msec. (optionally less than 1 psec.).

In step d) of the method, in addition a determination of the angle distribution of the scattered light can be effected, preferably via subdivision of the measured images at the first and/or second image sensor into many partial areas with respectively a specific number of pixels, the subdivision being effected along the scattering angle relative to the radiation direction of the laser and subsequently the angle distribution of the scattered light intensity being determined over the averaged brightness values for each partial area. With the help of the angle distribution, a conclusion can likewise be made with respect to sample properties, such as for example the particle size, the distribution thereof and the particles shape (static light scattering).

Between collimator and throughflow cuvette, an optical lens, preferably a spherical optical lens, can be disposed.

Between throughflow cuvette and detector, there can be disposed i) at least one optical lens, preferably at least two optical lenses, particularly preferably at least three optical lenses (spherical or cylindrical); and/or
ii) at least one diaphragm, preferably a slit diaphragm;
the at least one diaphragm being disposed preferably between at least two optical lenses.

Between throughflow cuvette and detector, there can be disposed
i) at least one cylindrical converging lens, preferably at least two cylindrical converging lenses, particularly preferably at least two cylindrical converging lenses with cylinder axes perpendicular to each other; and/or
ii) at least one spherical converging lens; and/or
iii) at least one diaphragm, preferably at least one slit diaphragm;
preferably from throughflow cuvette in the direction of the beam splitter, at least two cylindrical converging lenses or a cylindrical converging lens, a spherical converging lens, a diaphragm (in particular a slit diaphragm) and a cylindrical converging lens.

The radiated and unscattered laser light can be directed onto a beam collector after passing through the throughflow cuvette.

Furthermore, a device for determining the average particle size of particles, which are suspended in a liquid and flowing medium, via dynamic light scattering is provided according to the invention. The device comprises
a) a throughflow cuvette for directing a liquid medium with specific viscosity and specific refractive index, which comprises particles in suspended form, in a laminar flow through a throughflow cuvette along a flow direction;
b) a laser for radiating laser light with a specific wavelength in a radiation direction onto a liquid medium situated in the throughflow cuvette, a collimator being disposed between the laser and the throughflow cuvette;
c) a temperature sensor for measuring the temperature of the liquid medium; and
d) a detector for measuring the intensity of scattered laser light in the form of images, the detector being disposed perpendicular to the flow direction and at a specific angle of 10° to <180° relative to the radiation direction, and the detector
  i) comprising a beam splitter which deflects the scattered laser light onto a first and a second light-sensitive sensor, the two sensors being suitable for detecting images with respectively a specific number of pixels, and the two sensors being configured such that they detect scattered laser light alternatingly with a specific delay time as image; or
  ii) comprising a camera which has a light-sensitive sensor surface which is suitable for detecting images with respectively a specific number of pixels, the sensor surface being configured such that it detects scattered laser light with a specific delay time between two successive images as image;
e) a data processing device for receiving the images measured at the detector, the data processing device being configured for implementing the following steps:
  1) standardising the measured images so that the measured intensity of the laser light (i.e. the exposure values of the pixels) obtains the same average and the same standard deviation in the case of all images;
  2) determining an offset and an angle of rotation of a pattern on at least one partial region of a first image relative to a pattern on at least a partial region of a second image following temporally thereafter and using this information in order to make the patterns of the two images congruent;
  3) subdividing the congruent images respectively into many individual partial areas with respectively a specific number of pixels and averaging the brightness values of the pixels of the many individual partial areas; and
  4) correlating the averaged brightness values of the pixels of the many individual partial areas of the first image with the averaged brightness values of the pixels of the many individual congruent partial areas of the second image (cross-correlation between the individual images), a correlation value being produced for each pair of congruent partial areas of the images;
  5) averaging over all obtained correlation values to form an average correlation value for the two images.

The device is characterised in that it is configured for measuring, with a first and at least a second, different from the first, delay time, for indicating an autocorrelation function from the hereby respectively obtained, averaged correlation values, and for determining the average particle size by means of the autocorrelation function, the measured temperature of the liquid medium, the viscosity and the refractive index of the liquid medium, the wavelength of the laser light, the angle of the detector.

The advantage of the device according to the invention is the simple adjustment of its components (e.g. of the laser and/or of the image sensors) since these need not be positioned with micrometric precision.

In the device, the throughflow cuvette can have a diameter perpendicular to the flow direction which is greater than the diameter of the radiated laser light.

The laser can be disposed such that the laser light radiates parallel to the flow direction or at an angle of >0° to <180° (e.g. 90°) relative to the flow direction. Radiation at an angle >0° to <180° relative to the flow direction has the advantage that the connections for the sample inflow and sample outflow need not be disposed perpendicular to the radiation direction at the throughflow cuvette (i.e. on the long side thereof), but rather can also be disposed parallel to the radiation direction at the throughflow cuvette (i.e. at its transverse side). As a result, turbulence of the liquid medium can be avoided and a laminar flow can be ensured even at high flow rates. Furthermore, the laser light in this variant passes through a smaller sample volume of the throughflow cuvette and is hence less strongly attenuated in the case of concentrated samples, which enables measurement also of highly concentrated samples.

The light-sensitive sensors and/or the light-sensitive sensor surface can comprise a sensor which is selected from the group consisting of CCD sensors, CMOS-APS sensors, photodiode arrays, avalanche photodiode arrays and combinations hereof, or consist thereof.

The device can be characterised in that the data processing device is configured such that determination of the offset and of the angle of rotation of the signals measured at the two detectors is effected via a digital image processing method, preferably via the "template matching" method.

The data processing device of the device can thus be configured for subdividing the measured images into more than 100, preferably more than 1,000, particularly preferably more than 10,000, in particular more than 90,000, partial areas.

In a preferred embodiment, the first and the second detector are adjusted such that the delay time between the first and second detector is less than 10 sec., preferably less than 1 sec., particularly preferably less than 10 msec., in particular less than 0.1 msec. (optionally less than 1 psec.).

The device can be configured furthermore for implementing a determination of the angle distribution of the scattered light, preferably via a subdivision of the measured images at the first and/or second image sensor into many partial areas with respectively a specific number of pixels, the subdivision being effected along the scattering angle relative to the radiation direction of the laser and subsequently the angle distribution of the scattered light intensity being determined over the averaged brightness values for each partial area.

In the device, an optical lens, preferably a spherical optical lens, can be disposed between collimator and throughflow cuvette.

In the device, between throughflow cuvette and detector, there can be disposed
i) at least one optical lens, preferably at least two optical lenses, particularly preferably at least three optical lenses (spherical or cylindrical); and/or
ii) at least one diaphragm, preferably a slit diaphragm;
the at least one diaphragm being disposed preferably between at least two optical lenses.

In a preferred embodiment, in the device between the throughflow cuvette and the detector, there is disposed
i) at least one cylindrical converging lens, preferably at least two cylindrical converging lenses, particularly preferably at least two cylindrical converging lenses with cylinder axes perpendicular to each other; and/or
ii) at least one spherical converging lens; and/or
iii) at least one diaphragm, preferably at least one slit diaphragm; preferably from throughflow cuvette in the direction of the beam splitter, at least two cylindrical converging lenses or a cylindrical converging lens, a spherical converging lens, a diaphragm (in particular a slit diaphragm) and a cylindrical converging lens.

The device can comprise a beam collector which is disposed such that radiated and unscattered laser light impinges thereon after passing through the throughflow cuvette.

The device can be part of a device for nanoparticle production. In this embodiment, the produced nanoparticles can be measured "inline".

Furthermore, the device can be a portable device.

The subject according to the invention is intended to be explained in more detail with reference to the subsequent Figures and examples without wishing to restrict said subject to the specific embodiments illustrated here.

REFERENCE NUMBER LIST

1: laser
2: collimator
3: third cylindrical optical lens
4: throughflow cuvette
5: beam collector
6: first cylindrical optical lens (converging lens)
7: second cylindrical optical lens (converging lens)
8: beam splitter
9: light-sensitive sensor or light-sensitive sensors
10: slit diaphragm
11: fourth cylindrical optical lens (converging lens)
12: spherical optical lens FIG. 1 shows schematically in a plan view the construction of a device according to the invention having two image sensors. The device comprises a laser 1 as radiation source, a collimator 2 for forming the laser beam into a radiation direction, a cylindrical throughflow cuvette 4 which has planar windows on the bases, and a beam collector 5 on which the unscattered laser light can impinge. Perpendicular to the radiation direction, the device comprises a first optical cylinder lens 6, a second optical cylinder lens 7, a beam splitter 8 and two image sensors 9. The two optical cylinder lenses 6, 7 form the sensor optics, the cylinder axis of the first optical lens 6 being parallel to the flow direction of the sample and the cylinder axis of the second optical cylinder lens 7 being perpendicular to the cylinder axis of the first optical lens 6. Furthermore, the device comprises a temperature sensor and an electronic control. The electronic control is suitable for processing information of the image sensors 9 and of the temperature sensor, for configuring the image sensors and for triggering exposure thereof. Furthermore, the electronic control can be suitable for switching on and off the laser (e.g. at a specific frequency). Furthermore, the device comprises an electronics unit for transmitting the data to a PC. The image sensors 9 are fitted at the outputs of the beam splitter 8 such that they cover equivalent spatial angle regions of the light incident in the beam splitter 8. However they need not be adjusted precisely to the pixel. The images are readjusted by the software during the measurement. The laser 1 is positioned such that the laser light crosses through the collimator 2 and radiates into the throughflow cuvette 4. The scattering volume in the throughflow cuvette 4 is spanned by the beam of the laser 1 and the object plane of the sensor optics. The sample can hence flow laminarly parallel to the object plane of the sensor optics through the scattering volume, as a result of which all volume elements of the laminarly flowing sample move at an approximately uniform speed without being deformed. The particles contained therein change, in the ideal case, their relative spacings relative to each other exclusively by Brownian motion. The sensor optics image the scattered light from volume regions of the scattering volume in the throughflow cuvette 4 onto surface regions of the image sensors 9. The scattered light of the various volume regions thereby overlaps only peripherally. The light of the laser 1 (marked by the thick broken line) is collimated with the help of a collimator 2 to form as thin a beam as possible and is radiated along the cylinder axis in the centre through the throughflow cuvette 4. The sample flows into the throughflow cuvette 4, then parallel to the beam direction of the laser light, and then out again. The flow direction (marked by arrows) here is parallel to the light beams of the laser 1. Since the throughflow cuvette 4 is substantially wider than the laser beam, the scattered volume captures only a very small part of the flow profile within the throughflow cuvette 4. The particles in the scattering volume move therefore at an approximately uniform speed. Perpendicular to the laser direction there is situated the axis of the sensor optics (thin broken line). The beam splitter 8 and the two sensors 9 are situated behind a first and a second optical lens which form the optics for the scattered light. The first optical cylinder lens 6 produces no imaging according to lens law because it concentrates merely the scattered light from the throughflow cuvette 4 onto the sensors 9 (effect of a converging lens). The second optical cylinder lens 7 produces an image of the scattering volume on the two sensors 9. The coherent scattered light from a section within the scattering volume can thus interfere on the sensor 9 within a strip-like surface region.

Figure 2A:
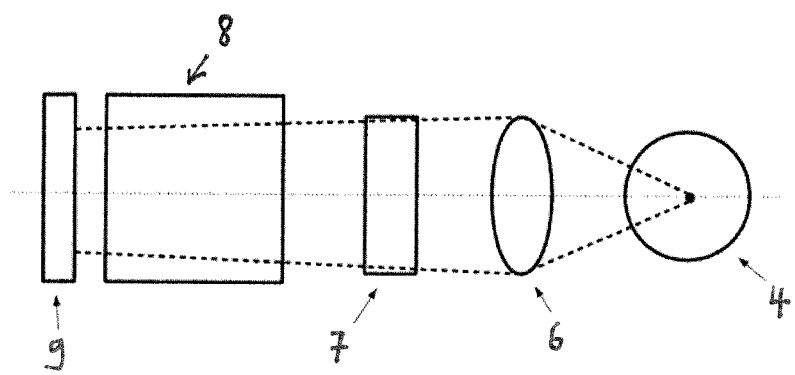
Figure 2B:
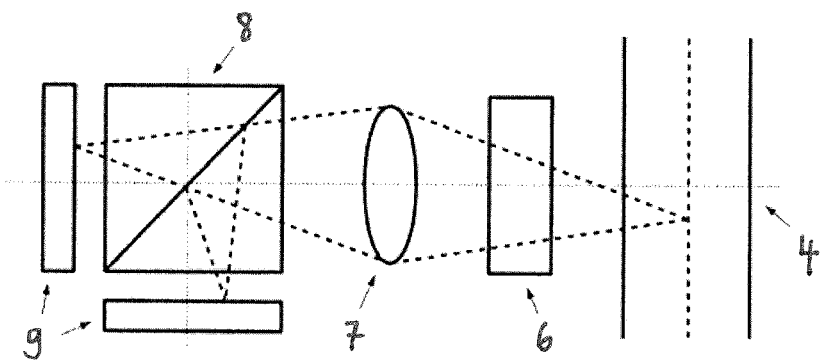

FIG. 2 shows schematically the path of the scattered light in a construction of a device according to the invention according to FIG. 1. In FIG. 2A, the side view on the device is illustrated, whilst FIG. 2B shows the plan view on the device. Starting from the throughflow cuvette 4, the scattered light passes through a first optical cylinder lens 6, a second optical cylinder lens 7 and then the beam splitter 8, by which it is deflected onto the two sensors 9.

Figure 3A:
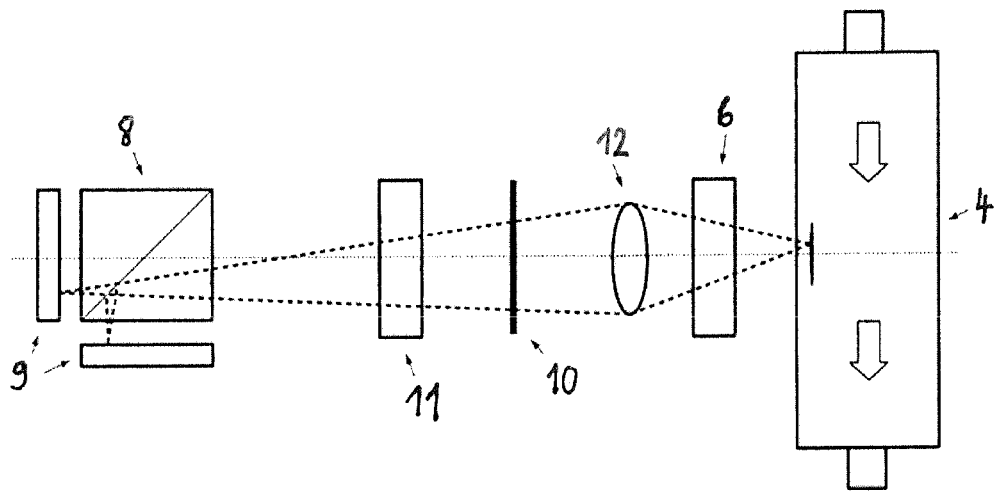
Figure 3B:
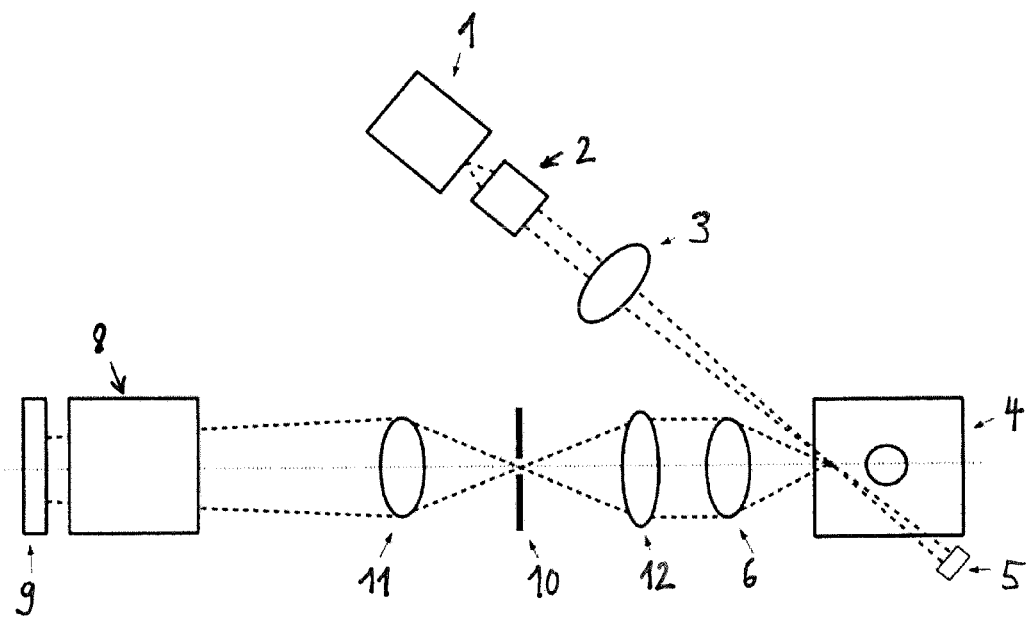

FIG. 3 shows schematically the construction of a device according to the invention having two image sensors and a cuboid throughflow cuvette in plan view (FIG. 3A) and in side view (FIG. 3B). The throughflow cuvette 4 has a window for irradiation of the light beams of the laser 1 and a window for emergence of the unscattered laser light into the beam collector 5. The inflow and outflow for the sample (i.e. the liquid medium with suspended particles) are situated at the end-sides of the throughflow cuvette (i.e. a window for entrance of the laser light beam and, at the same time, emergence of the scattered light, and a window for emergence of the laser light beam in the direction of the beam collector 5). In FIG. 3B, the laser 1 is illustrated in addition. Light emitted by the laser 1 passes firstly through a collimator 2 and thereafter is focused by a third optical cylinder lens 3 with a large focal width in the edge region of the throughflow cuvette 4 (preferably directly behind the window). The oblong focal region of the laser light in the throughflow cuvette 4 is marked as black region and is subsequently termed "focal line". The focal line extends parallel to the flow direction of the sample (flow direction in the throughflow cuvette 4 is illustrated by arrows). The propagation direction of the laser light, in this embodiment, is perpendicular to the flow direction of the sample through the throughflow cuvette 4 (and not parallel hereto, as in the embodiment according to FIG. 1). A part of the scattered light from the focal region emerges at the side from the throughflow cuvette 4 out of the window, passes through the sensor optics and impinges on the sensors 9. The path of the scattered light in this embodiment is illustrated both in FIG. 3A and in FIG. 3B. It becomes clear in these Figures that the scattered light firstly passes through a first optical cylinder lens 6 and then a spherical optical lens 12. After these two optical lenses 6, 12, the light passes through a slit diaphragm 10 and subsequently a fourth cylindrical optical lens 11. After this fourth cylindrical optical lens 11, the light impinges on the beam splitter 8 and is deflected there onto the two image sensors 9. The optical axis of the sensor optics, illustrated by a thin broken line, is perpendicular to the focal line of the laser 1. By the positions of the slit diaphragm 10 and the focal line, the size and volume of the scattering volume is established. The slit diaphragm 10, depending on slit width and slit position, hereby allows only the light from a small spatial region to pass through to the sensors 9. The section volume from this spatial region and the focal line is the scattering volume. Since the throughflow cuvette 4 is substantially wider than the diameter of the scattering volume, the latter detects only a very small part of the flow profile. The particles in the scattering volume move therefore at an approximately uniform speed. The first optical lens 6 collects scattered light with an intensity distribution, dependent upon the angle relative to the propagation direction of the laser radiation. This distribution is then projected through the remaining optical elements onto the sensors 9. In the orthogonal spatial direction (=image plane of the plan view), imaging of the scattering volume is effected onto the surface of the sensors 9. In this direction, the two optical lenses 6, 11 and the slit diaphragm 10 have no function. In FIG. 3A, the beam path of the imaging of a scattering volume element onto the sensors 9 is illustrated by a broken line. Since the imaging takes place only along one spatial direction, the scattered light from a portion of the scattering volume can interfere on a strip-like surface portion on the sensor 9.

EXAMPLE 1—CONSTRUCTION OF A DEVICE ACCORDING TO THE INVENTION AND EXPLANATION OF ITS MODE OF OPERATION

A device according to the invention comprises a laser, a collimator, a throughflow cuvette, a first optical lens, a second optical lens, a beam splitter and two light-sensitive sensors. A sample, i.e. a liquid medium with suspended particles, is directed through the throughflow cuvette, the sample and hence the suspended particles moving along the object plane of the sensor optics through the scattering volume. The scattered light produced by the moved, suspended particles produces an optical image on the respective sensor. Because the scattered light is coherent, it produces an interference pattern on the image sensor surface.

The particles contained in a volume element of the sample within the scattering volume are not influenced in their relative spacings by the flow. Because the liquid medium ("the solvent") is however subject to Brownian molecular motion, the relative spacings between the particles change over time. At the same time, the flow moves all the particles in the scattering volume at a uniform speed in the same direction. For this reason, the interference pattern, because of the flow, moves over the sensor and makes, in the meantime, because of the time-dependent change in the relative particle spacings, a temporal development. The two sensors of the device produce an image of the pattern temporally (alternately) in succession. The interference patterns of two successive images are displaced or rotated relative to each other by the displacement through the flow and by the deviation of the two sensor positions at the beam splitter. The image recorded temporally later has furthermore additional deviations because of the Brownian molecular motion.

The images are transferred, after recording thereof at the respective sensor, to a data processing device (e.g. to a PC). After the transfer to a PC, the images are firstly standardised by software. The average and the standard deviation of the exposure values in the case of all images of one measurement are thereby set to the same values.

Thereafter, with the help of a digital image processing method (e.g. with the so-called "template matching" method), the offset and the angle of rotation of both images are determined relative to each other. If the relative positions are known, then the images (i.e. the interference patterns) are made congruent and a correlation value can be calculated. The flow of the sample and the deviations in the positions of the image sensors at the beam splitter are hence compensated for by the software.

The images are subsequently subdivided into many smaller areas and the brightness values of the pixels therein are averaged respectively. The thus calculated brightness values of these "virtual detectors" on both images are correlated (cross-correlation) and thereafter the averaging of all correlation values of the images takes place. A plurality of measurements with different delay times is implemented. From the correlation values thereof, the autocorrelation function and in addition the average particle size in the sample can be determined. This takes place likewise via the data processing device.

During the measurements, the temperature values of the sample are stored. From the measured values for correlation and temperature and from those properties of the sample expected as known, such as the viscosity and the refractive index of the liquid medium, the wavelength of the laser light, the angle of the detector, the average hydrodynamic radius in the sample can then be determined. The device according to the invention has the advantage that the flow speed of the sample is not part of the calculation of the hydrodynamic radius, i.e. the calculation is independent of the flow speed.

EXAMPLE 2—CONSTRUCTION OF A DEVICE ACCORDING TO THE INVENTION HAVING A CAMERA INSTEAD OF TWO SENSORS WITH BEAM SPLITTER

Here the image sensors and the beam splitter from example 1 and FIGS. 1 to 3 are replaced by a camera. The remainder is identical to the device presented in example 1 and FIGS. 1 to 3. Instead of processing the images of both sensors at the beam splitter, in this variant two successively recorded images of the camera are used.

The invention claimed is:
1. A method for determining the average particle size of particles which are suspended in a liquid and flowing medium, via dynamic light scattering, comprising the steps
   a) conducting a liquid medium with specific viscosity and specific refractive index, which comprises particles in suspended form, in a laminar flow through a throughflow cuvette along a flow direction;
   b) radiation of laser light of a specific wavelength in a radiation direction onto the liquid medium via a laser, a collimator being disposed between the laser and the throughflow cuvette;
   c) measuring the temperature of the liquid medium;
   d) measuring the intensity of scattered laser light, via a detector, in the form of images, the detector being disposed perpendicular to the flow direction and at a specific angle of 10° to <180° relative to the radiation direction, and the detector
      i) comprising a beam splitter which deflects the scattered laser light onto a first and a second light-sensitive sensor, the two sensors being suitable for detecting images with respectively a specific number of pixels, and the two sensors being configured such that they detect scattered laser light alternatingly with a specific delay time as image; or
      ii) comprising a camera which has a light-sensitive sensor surface and which is suitable for detecting images with respectively a specific number of pixels, the sensor surface being configured such that it detects scattered laser light with a specific delay time between two successive images as image; and
   e) transmitting the images measured at the detector to a data processing device, the data processing device implementing the following steps:
      1) standardising the measured images so that the measured intensity of the laser light obtains the same average and the same standard deviation in the case of all images;
      2) determining an offset and an angle of rotation of a pattern on at least a partial region of a first image relative to a pattern on at least a partial region of a second image following temporally thereafter and using this information in order to make the patterns of the two images congruent;
      3) subdividing the congruent images respectively into many individual partial areas with respectively a specific number of pixels and averaging the brightness values of the pixels of the many individual partial areas; and
      4) correlating the averaged brightness values of the pixels of the many individual partial areas of the first image with the averaged brightness values of the pixels of the many individual congruent partial areas of the second image, a correlation value being produced for each pair of congruent partial areas of the two images;
      5) averaging over all obtained correlation values to form an average correlation value for the two images;
   characterised in that steps c) to d) are implemented with at least a first and a second, different from the first, delay time, an autocorrelation function is indicated from the hereby respectively obtained, averaged correlation values, and the average particle size is determined by means of the autocorrelation function, the measured temperature of the liquid medium, the viscosity and the refractive index of the liquid medium, the wavelength of the laser light and the angle of the detector.

2. The method according to claim 1, characterised in that a liquid medium, which is transparent for the wavelength of the laser light, is used.

3. The method according to claim 1, characterised in that the particles have an average size in the nanometre range to micrometre range, preferably an average size of 1 nm to 1,000 μm, measured with dynamic light scattering.

4. The method according to claim 1, characterised in that the throughflow cuvette has a diameter perpendicular to the flow direction which is greater than the diameter of the radiated laser light.

5. The method according to claim 1, characterised in that the light-sensitive sensors and/or the light-sensitive sensor surface comprises a sensor which is selected from the group consisting of CCD sensors, CMOS-APS sensors, photodiode arrays, avalanche photodiode arrays and combinations hereof, or consists thereof.

6. The method according to claim 1, characterised in that, in the data processing device, determination of an offset and of an angle of rotation of the signals measured at the two detectors is effected via a digital image processing method, preferably the "template matching" method.

7. The method according to claim 1, characterised in that the measured images are subdivided into more than 100, preferably more than 1,000, particularly preferably more than 10,000, in particular more than 90,000, partial areas.

8. The method according to claim 1, characterised in that the delay time between the first and second detector is less than 10 sec., preferably less than 1 sec., particularly preferably less than 10 msec., in particular less than 0.1 msec.

9. The method according to claim 1, characterised in that, in step d), in addition a determination of the angle distribution of the scattered light is effected, preferably via subdivision of the measured images at the first and/or second image sensor into many partial areas with respectively a specific number of pixels, the subdivision being effected along the scattering angle relative to the radiation direction of the laser and subsequently the angle distribution of the scattered light intensity being determined over the averaged brightness values for each partial area.

10. The method according to claim 1, characterised in that, between throughflow cuvette and detector, there is disposed
   i) at least one cylindrical converging lens, preferably at least two cylindrical converging lenses, particularly preferably at least two cylindrical converging lenses with cylinder axes perpendicular to each other; and/or ii) at least one spherical converging lens; and/or iii) at least one diaphragm, preferably at least one slit diaphragm;

preferably from throughflow cuvette in the direction of the beam splitter, at least two cylindrical converging lenses or a cylindrical converging lens, a spherical converging lens, a diaphragm and a cylindrical converging lens.

11. A device for determining the average particle size of particles, which are suspended in a liquid and flowing medium, via dynamic light scattering, comprising a) a throughflow cuvette for directing a liquid medium with specific viscosity and specific refractive index, which comprises particles in suspended form, in a laminar flow through a throughflow cuvette along a flow direction;

b) a laser for radiating laser light of a specific wavelength in a radiation direction onto a liquid medium situated in the throughflow cuvette, a collimator being disposed between the laser and the throughflow cuvette;

c) a temperature sensor for measuring the temperature of the liquid medium; and d) a detector for measuring the intensity of scattered laser light in the form of images, the detector being disposed perpendicular to the flow direction and at a specific angle of 10° to <180° relative to the radiation direction, and the detector i) comprising a beam splitter which deflects the scattered laser light onto a first and a second light-sensitive sensor, the two sensors being suitable for detecting images with respectively a specific number of pixels, and the two sensors being configured such that they detect scattered laser light alternatingly with a specific delay time as image; or ii) comprising a camera which has a light-sensitive sensor surface which is suitable for detecting images with respectively a specific number of pixels, the sensor surface being configured such that it detects scattered laser light with a specific delay time between two successive images as image;

e) a data processing device for receiving the images measured at the detector, the data processing device being configured for implementing the following steps:

1) standardising the measured images so that the measured intensity of the laser light obtains the same average and the same standard deviation in the case of all images;

2) determining an offset and an angle of rotation of a pattern on at least one partial region of a first image relative to a pattern on at least a partial region of a second image following temporally thereafter and using this information in order to make the patterns of the two images congruent;

3) subdividing the congruent images respectively into many individual partial areas with respectively a specific number of pixels and averaging the brightness values of the pixels of the many individual partial areas; and 4) correlating the averaged brightness values of the pixels of the many individual partial areas of the first image with the averaged brightness values of the pixels of the many individual congruent partial areas of the second image, a correlation value being produced for each pair of congruent partial areas of the two images;

5) averaging over all obtained correlation values to form an average correlation value for the two images;

characterised in that the device is configured for measuring, with a first and at least a second, different from the first, delay time, for indicating an autocorrelation function from the hereby respectively obtained, averaged correlation values, and for determining the average particle size by means of the autocorrelation function, the measured temperature of the liquid medium, the viscosity and the refractive index of the liquid medium, the wavelength of the laser light, the angle of the detector.

12. The device according to claim 11, characterised in that the throughflow cuvette has a diameter perpendicular to the flow direction which is greater than the diameter of the radiated laser light.

13. The device according to claim 11, characterised in that the light-sensitive sensors and/or the light-sensitive sensor surface comprises a sensor which is selected from the group consisting of CCD sensors, CMOS-APS sensors, photodiode arrays, avalanche photodiode arrays and combinations hereof, or consists thereof.

14. The device according to claim 11, characterised in that the data processing device is configured such that determination of the offset and of the angle of rotation of the signals measured at the two detectors is effected via a digital image processing method, preferably via the "template matching" method.

15. The device according to claim 11, characterised in that the data processing device is configured for subdividing the measured images into more than 100, preferably more than 1,000, particularly preferably more than 10,000, in particular more than 90,000 partial areas.

16. The device according to claim 11, characterised in that the first and the second detector are adjusted such that the delay time between the first and second detector is less than 10 sec., preferably less than 1 sec., particularly preferably less than 10 msec., in particular less than 0.1 msec.

17. The device according to claim 11, characterised in that the device is furthermore configured for implementing a determination of the angle distribution of the scattered light, preferably via a subdivision of the measured images at the first and/or second image sensor into many partial areas with respectively a specific number of pixels, the subdivision being effected along the scattering angle relative to the radiation direction of the laser and subsequently the angle distribution of the scattered light intensity being determined over the averaged brightness values for each partial area.

18. The device according to claim 11, characterised in that, between throughflow cuvette and detector, there is disposed i) at least one cylindrical converging lens, preferably at least two cylindrical converging lenses, particularly preferably at least two cylindrical converging lenses with cylinder axes perpendicular to each other; and/or ii) at least one spherical converging lens; and/or iii) at least one diaphragm, preferably at least one slit diaphragm;

preferably from throughflow cuvette in the direction of the beam splitter, at least two cylindrical converging lenses or a cylindrical converging lens, a spherical converging lens, a diaphragm and a cylindrical converging lens.

* * * * *